United States Patent [19]

Appelder et al.

[11] 3,876,297

[45] Apr. 8, 1975

[54] SLIDE IDENTIFICATION

[75] Inventors: Roger H. Appeldorn; George J. Knox, both of White Bear Lake, Minn.

[73] Assignee: Minnesota Mining and Manufacturing Company, St. Paul, Minn.

[22] Filed: June 6, 1972

[21] Appl. No.: 260,184

[52] U.S. Cl. .................... 353/19; 353/120; 360/2; 360/101; 360/107

[51] Int. Cl. .................... G03b 31/06; G11b 5/80

[58] Field of Search ......... 353/15, 19, 120; 274/4 J, 274/9 C; 360/2, 101, 107

[56] References Cited

UNITED STATES PATENTS 3,594,076 7/1971 Licitis et al. .................... 353/120

*Primary Examiner*—Richard E. Aegerter
*Assistant Examiner*—Steven L. Stephan
*Attorney, Agent, or Firm*—Alexander, Sell, Steldt & DeLaHunt

[57] ABSTRACT

An apparatus for audio identification of a photographic transparency mounted in a slide frame, the slide frame being provided on one face with a resiliently backed strip of magnetic recording tape capable of resolving a 600 microinch signal. The slide frame is positioned for projection of the images on the transparency and a magnetic transducer having a gap width less than 200 microinches is biased against and moved in a straight line along the strip of magnetic tape on the positioned slide frame from one end thereof to the other at a uniform velocity less than 0.75 inch per second to record or reproduce a transparency identifying message on the magnetic tape.

5 Claims, 8 Drawing Figures

SLIDE IDENTIFICATION

FIELD OF THE INVENTION

The present invention relates to an apparatus for audio identification of a photographic transparency mounted on a slide frame.

BACKGROUND OF THE INVENTION

The prior art is replete with audio-visual machines wherein information about a 35mm transparency is recorded on magnetic recording tape which is supported on the frame in which the transparency is mounted. Such machines have generally required a special frame in addition to or in place of the normal slide frame in which 35mm transparencies are mounted after processing. Such machines and frames have been rather large, complex and expensive for home use by the individual consumer to provide audio identification of his personal photographic slides.

The slide frame of the 35mm photographic transparency, which is by far the most common, is 2 inches square. Recent efforts at providing a home unit have considered the possibility of laminating magnetic tape directly to the cardboard frame and moving the magnetic transducer in a complex tortuous path as illustrated in U.S. Pat. No. 3,594,076. However, the complex transducer path has made precision parts necessary to consistently reproduce the complex movement thereby greatly increasing the cost of manufacturing such machines.

SUMMARY OF THE INVENTION

The present invention provides an apparatus for simple and effective audio identification of a photographic transparency without requiring a frame other than the ordinary photographic transparency slide frame. "Slide frame," as used herein with reference to the present invention, refers to any frame less than 3 inches square containing a photographic transparency.

The apparatus of the present invention is constructed for use with a photographic transparency mounted in a slide frame. A composite identification strip comprising a strip of magnetic tape capable of resolving a 600 microinch signal secured to and backed by a strip of a resilient material is provided for attachment to one face of a slide frame. The composite identification strip has a smooth, uniform, magnetizable surface and it is compressible at least 0.001 inch and not more than 0.010 inch by a 0.4 inch radius cylinder extending across a 0.15 inch width of the composite and forced against the magnetizable surface with 250 grams force. The apparatus comprises a slide projector including means for positioning a slide frame for projection of images on the transparency. A magnetic transducer having a cylindrical face with an effective radius of 0.04 inch to 1.0 inch and a gap width less than 200 microinches is supported for movement along the magnetizable surface from one end thereof to the other and it is biased against the magnetizable surface of the composite identification strip on the projection positioned slide frame with a force sufficient to compress the composite at least 0.001 inch and not more than 0.007 inch. And, a drive is provided to move the transducer in a single pass along the strip of magnetic tape at a uniform velocity less than 0.75 inches per second to record or reproduce a transparency identifying message on the magnetic tape.

Figure 1:
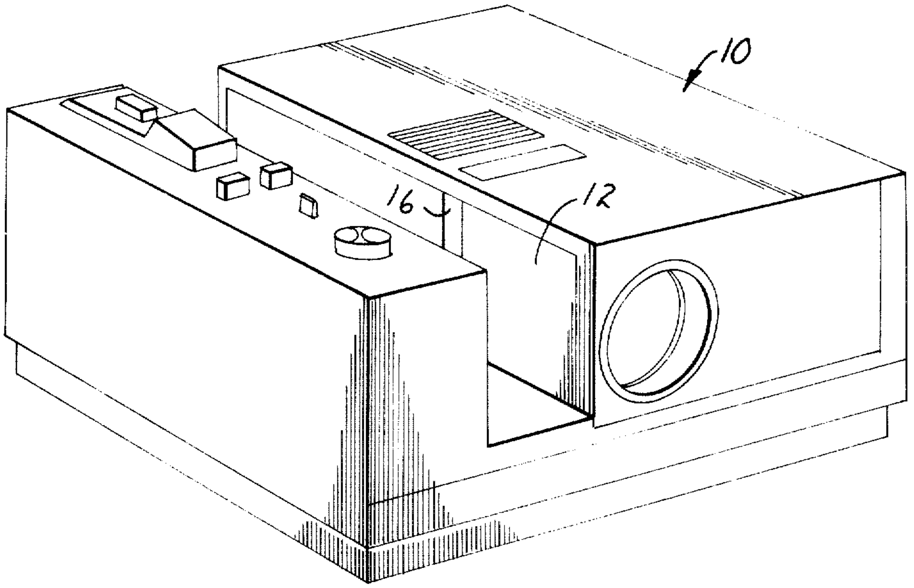
FIG. 1 is an exterior perspective view showing the front, top and one side of a slide identification machine constructed in accordance with the present invention.
Figure 7:
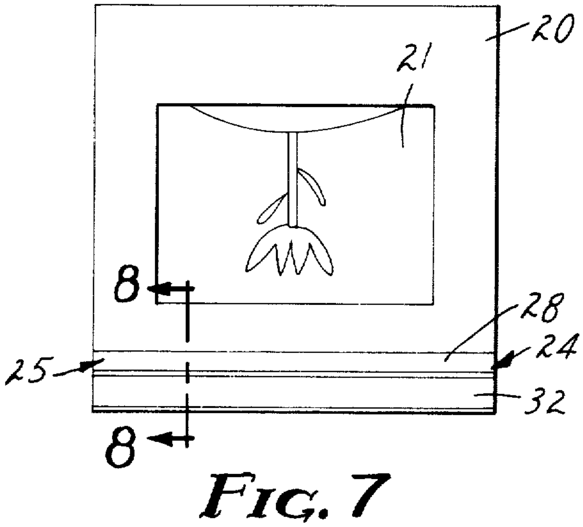
FIG. 7 is a front elevation view of a photographic slide with a slide identification clip secured thereto for use in the machine of FIGS. 1–6 to practice the method of the present invention.
Figure 8:
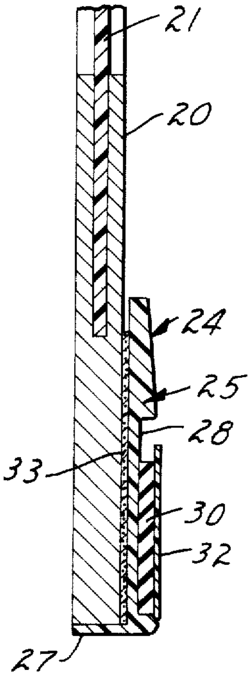
FIG. 8 is a cross-sectional view taken along line 8—8 of FIG. 7.

The slide identification machine of the present invention has an exterior cabinet 10 which is formed with a channel 12 extending parallel to the optical axis of the projector. The channel 12 is formed to receive and support a slide tray 14 and it has a slide receiving slot 16 midway of one vertical wall to align one at a time with transverse slide receptacles in the slide tray 14. The slide tray 14 is formed with gear teeth 13 and a complementary gear 17 in the machine engages the teeth 13 on the tray 14 to provide stepwise advancement of the slide tray to align successive slide receptacles therein with the slide receiving slot 16 in the machine. The slide tray 14 is also formed with openings 15 communicating with the slide receptacles through which a slide pusher bar 18 aligned with the slide receiving slot 16 may enter an aligned slide receptacle to push the slide therein into the jaws 22 at the end of a slide return arm 19 for movement through the slide receiving slot 16 into the machine, as is conventional in slide projectors.

The illustrated machine is constructed for use with the common two-inch square cardboard slide frame 20 in which is mounted a 35mm photographic transparency 21. A slide identification clip 24 constructed in accordance with the invention of U.S. Pat. No. 3,807,851 is attached to the slide frame 20. The clip 24 has a unitary base 25, which may be an extruded plastic, with walls 27 and 28 to extend along the bottom edge and one face, respectively, of the slide frame 20. A strip of a resilient material 30 is affixed to the wall 28 of the base 25 extending along the face of the slide frame and a strip of magnetic tape 32 capable of resolving a 600 microinch signal is affixed to and overlays the strip of resilient material 30. A pressure-sensitive adhesive layer 33 permits the slide identification clip 24 to be attached to the slide frame 20, thereby to mount on one face of the slide frame a composite identification strip comprising a strip of magnetic tape capable of resolving a 600 microinch signal secured to and backed by a strip of a resilient material, the composite having a smooth, uniform, magnetizable surface. As used herein, the magnetizable surface is "smooth" if its surface irregularities are less than the predetermined depth of penetration of the magnetic transducer into the tape-resilient material composite.

The tape-resilient material composite identification strip is chosen to be compressible between 0.001 inch and 0.010 inch by a 0.4 inch radius cylinder extending across a 0.15 inch width of the composite and forced against the tape with 250 grams force. When the composite strip is compressible more than 0.010 inch it is too soft to permit sufficiently accurate tracking of a magnetic transducer moved against and along the tape 32. When the composite is compressible less than 0.001 inch it is too firm to permit sufficient penetration by a magnetic transducer to allow for reasonable surface smoothness or head misalignment tolerances. The maximum desirable thickness of the composite identification strip is 0.060 inch. The resilient material 30 is, for example, a 1/64-inch thick strip of Type Y-9331 Scotch-Mount, an elastomeric foam having pressure sensitive adhesive on both faces, and the magnetic tape 32 is, for example, Type 277 Magnetic Cassette Tape, both of which are available from the 3M Company with offices at Saint Paul, Minn. While the use of the slide identification clip 24 is preferred, the composite identification strip may be directly mounted on the slide frame, particularly if the slide frame is made of a plastic.

The slide receiving slot 16 formed in the exterior cabinet 10 provides communication between the channel 12 and a projection position whereat the slide frame 20 is positioned with the center of the photographic transparency 21 mounted therein aligned with the optical axis of the projector.

Figure 4:
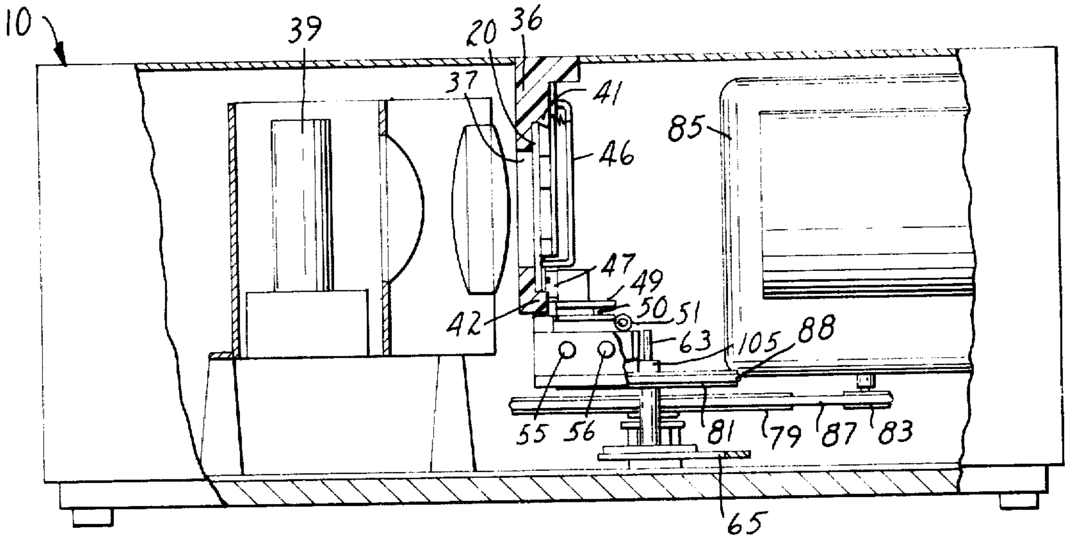
FIG. 4 is a cross-sectional view taken generally along line 4—4 of FIG. 2.

The slide projection position is defined at the back by a vertical wall 36 (see FIG. 4) formed with an aperture 37 through which light from a lamp 39 may pass to project the images on a projection positioned transparency 21. The top of the projection position is defined by a guide bar 41 which is formed with a lip to overhang the front face of a slide frame 20 while the base is defined by a horizontal ledge 42 extending from the vertical back wall 36. The distance of removal of the slide frame 20 from the slide tray 14 when completely in projection position is determined by a pair of stops 44 and 45 extending from the vertical wall 36 to define the end of the projection position. A slide bias bar 46 is pivoted above the slide projection position and extends downward to contact a projection positioned slide frame 20 below the transparency 21 therein and it is resiliently urged against the slide frame to bias the lower edge of the slide frame 20 against the vertical wall 36.

A magnetic transducer 47 having a gap width less than 200 microinches is supported adjacent the slide projection position for movement against and in a straight line along the strip of magnetic tape 32 on a projection positioned slide frame 20. The transducer has a cylindrical face with an effective radius of curvature between 0.04 inch and 1.0 inch to provide adequate tape-to-head contact in the system. By "effective radius" is meant the average radius in the area of the transducer face that contacts the tape, which definition is applicable to transducers with hyperbolic cylindrical faces as well as to those with circular cylindrical faces.

The transducer 47 is supported at one end of an arm 49 which is mounted at its opposite end on a pivot pin 50 extending upward from a movable carriage 52. The transducer 47 is biased toward engagement with the magnetic tape 32 on a projection positioned slide frame 20 by a helical tension spring 51 extending between the transducer support arm 49 and the movable carriage 52.

A pair of cylindrical rods 55 and 56 are supported at their ends in a U-shaped bracket 58 in a horizontal plane parallel to each other and to the length of the strip of magnetic tape 32 on a projection positioned slide frame 20. The rods 55 and 56 provide support for the generally rectangular carriage 52 which is bearinged for free slidable movement along the rods by four self-lubricating plastic bushings 60, one at each end of the carriage on each of the rods 55 and 56. Thus, the transducer 47 is supported on the carriage 52 for movement against and in a straight line along the strip of magnetic tape 32 on a projection positioned slide frame 20 from one end of the tape to the other. The transducer bias spring 51 is chosen to resiliently urge the transducer 47 against the tape 32 with a force sufficient to compress the tape-resilient material composite at least 0.001 inch and not more than 0.007 inch. With the previously specified range of deflections for acceptable composite strips this range of compressions assures sufficient tape-to-head contact for quality recording and reproduction. Practically, however, the softest acceptable material, which deflects 0.010 inch in the specified test, would not be used with the least head penetration which deflects the composite only 0.001 inch because the tape-to-head pressure would not be sufficient for good recording; a lower limit being attained, for example, with a 0.4 inch radius transducer forced against the composite with 50 grams force. And, the hardest acceptable material, which deflects 0.001 inch in the specified test, would not normally be used with the deepest head penetration because the machine parts would have to be made much stronger.

Motive force for driving the carriage 52 along the guide rods 55 and 56 is supplied by a capstan 63 which is mounted vertically on a horizontally pivotal link 65. The capstan support link 65 pivots to engage the capstan 63 with a strip 67 of a resilient material secured to the carriage 52 parallel to the direction of movement thereof along the rods 55 and 56, and, thus, parallel to the direction of movement of the transducer 47 along the magnetic tape 32 on a projection positioned slide frame 20.

The capstan support link 65 is pivoted at one end on a shaft 69 and a helical tension spring 71 at its opposite end (see FIG. 2) urges the capstan 63 into engagement with the resilient material 67 on the carriage 52. A pivoted solenoid actuated link 73 is biased by a tension spring 74 into engagement with the plunger of a solenoid 75. The solenoid link carries a vertical stop pin 77 into normal engagement with the end of the capstan support link 65. This retains the capstan support link against the bias of the spring 71 with the capstan 63 normally disengaged from the strip of resilient material 67 on the carriage 52. The solenoid 75 is positioned such that upon actuation its plunger pivots the solenoid link 75 against the bias of its spring 74 to move the pin 77 on the solenoid link 73 out of the path of the capstan support link 65.

The capstan support link pivot shaft 69 also supports a speed reduction pulley 79 having a large diameter and a small diameter drive surface. The capstan 63 carries a pulley 81 on the same horizontal plane as the smaller diameter drive surface of the speed reduction pulley 79. The larger diameter drive surface of the speed reduction pulley 79 is on the same horizontal plane as a pulley 83 secured to the drive shaft of a motor 85. The motor 85 is mounted on vibration damping motor mounts to isolate motor vibrations from the apparatus frame. A first elastic belt 87 links the motor pulley 83 to the larger diameter portion of the speed reduction pulley 79 and a second elastic belt 88 links the smaller diameter portion of the speed reduction pulley 79 to the capstan pulley 81 to drive the capstan 63. The ratio of the diameters of the capstan pulley 81, the larger and smaller diameter portions of the speed reduction pulley 79 and the motor pulley 83 are selected in view of the rotational speed of the motor 85 to produce a tangential velocity at the capstan 63 less than 0.75 inch per second.

Figure 5:
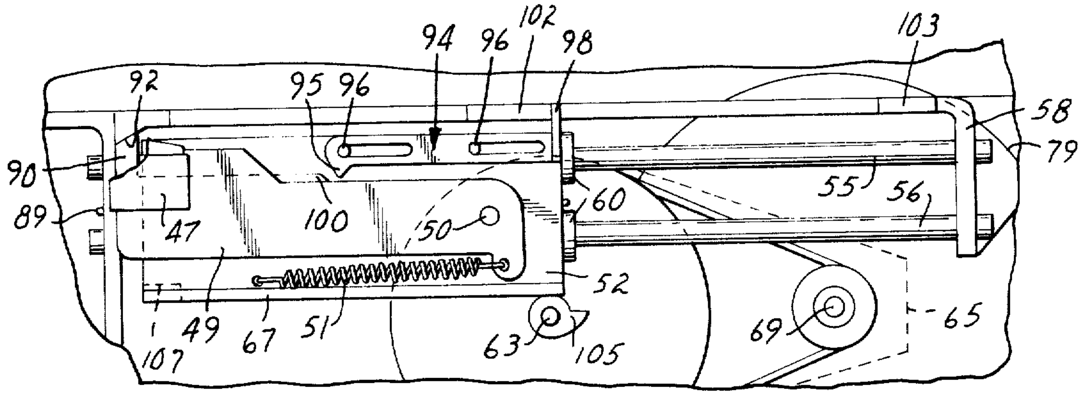
FIGS. 5 and 6 are top views of a part of the machine at two different positions.
Figure 6:
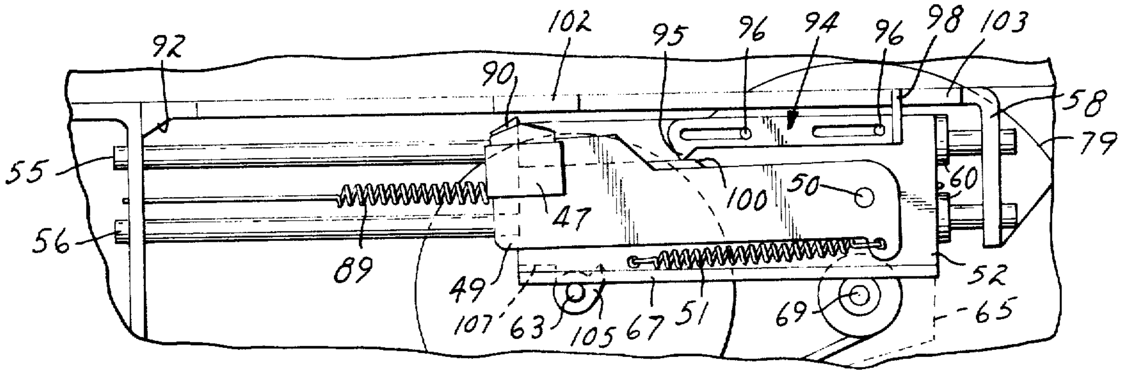

FIGS. 5 and 6 illustrate the two extreme positions of the transducer 47 as it is moved with the carriage 52 along the guide rods 55 and 56, FIG. 5 representing the "home" or rest position of the transducer 47. A helical carriage return tension spring 89 extends parallel to the guide rods 55 and 56 and is connected by one end to the end of the U-shaped support bracket 58 adjacent the home position of the transducer 47 and its opposite end is connected to the remote end of the carriage 52 to bias the carriage 52 and the magnetic transducer 47 to the home position.

In the home position the magnetic transducer 47 is spaced slightly to the left (as viewed in FIGS. 2 and 3) of the strip of magnetic tape 32 on a projection positioned slide frame 20. And, an ear 90 projecting from the transducer support arm 49 below the transducer 47 engages a camming surface 92 projecting away from the vertical wall 36 to cam the transducer away frokm the vertical wall 36 against the bias of its spring 51 out of the path of a slide frame 20 from the slide tray 14 to the projection position.

Means are also provided for camming the transducer 47 away from the slide projection position and for camming the capstan 63 away from the resilient material 67 on the carriage 52 when the carriage 52 has been driven by the capstan 63 a sufficient distance for the transducer 47 to traverse the entire length of the magnetic tape 32 on a projection positioned slide frame 20. Camming of the transducer 47 is accomplished by a camming link 94 which is supported on the carriage 52 by a pair of vertical pins 96 extending through elongate slots formed through the camming link 94. The vertical pins 96 permit sliding movement of the camming link 94 on the carriage 52 in a direction parallel to the direction of movement of the carriage. The camming link 94 is formed with a nose 95 to engage a camming step 100 formed on the transducer support arm 49 to pivot the transducer support arm away from the slide projection position against the force of its bias spring 51. The camming link 94 is also formed with an arm 98 extending outward perpendicular to the direction of travel of the carriage 52 and into the path of a pair of end stops 102 and 103 extending upward from the U-shaped guide rod support bracket 58. The end stop 103 is positioned to engage the arm 98 as the carriage 52 approaches the end of its travel removed from its home position. The camming link 94 is stopped by end stop 103 while the carriage continues to travel, thereby moving the camming step 100 on the head support arm 49 against the nose 95 of the camming link to cam the transducer 47 away from the slide projection position.

The home end stop 102 is positioned to engage the arm 98 extending from the camming link 94 as the carriage 52 is returned to its home position by the carriage return spring 89. It stops the camming link prior to the carriage reaching its home position thereby disengaging the nose 95 of the camming link 94 from the camming step 100 on the transducer support arm 49.

Camming of the capstan 63 away from the resilient material 67 on the carriage 52 is accomplished by a camming wing 105 secured to the capstan shaft below the level of the resilient material 67 on the carriage 52 to engage a tab 107 depending from the bottom of the trailing end of the carriage 52. Thus, when the carriage moves to a position with the tab 107 adjacent the capstan, the capstan rotates the camming wing 105 against the carriage tab 107 and causes the capstan support link 65 to be pivoted about its support shaft 69 moving the capstan away from the resilient material 67 on the carriage 52. Pivoting of the capstan support link 65 causes the free end thereof to be moved past the vertical pin 77 on the solenoid link 73 and the pin then moves into the path of the capstan support link to retain the capstan 63 disengaged from the resilient material 67 on the carriage 52.

In use, a slide tray 14 containing a plurality of 35mm slides with slide identification clips 24 secured to the frames 20 thereof is inserted into the channel 12 formed in the cabinet 10. The slide tray 14 is advanced by the gear 17 until a slide in one of the receptacles in the tray 14 is aligned with the slide receiving slot 16 in the machine cabinet 10. The machine may then be actuated.

Actuation of the machine causes the slide return arm 19 to move to a position with its free end adjacent the slide receiving slot 16. The slide pusher bar 18 then pivots upward and into the slide tray and impels the slide in the aligned receptacle into the jaws 22 of the slide return arm 19. Next, the slide return arm returns to its original position drawing the slide frame 20 with it into the slide projection position and against the stops 44 and 45 defining the end of the projection position.

When the slide frame 20 has reached the projection position the lamp 39 and lens system causes the images on the transparency 21 to be projected and they are, of course, focused on an appropriate surface removed from the machine.

Recording on or reproduction from the strip of magnetic tape 32 on the projection positioned slide frame 20 is initiated by sending an impulse to the solenoid 75 which pivots the solenoid link 73 to release the capstan link 65. The capstan link 65 is pivoted by its biasing spring 71 to engage the capstan 63 against the resilient material 67 on the carriage 52. The carriage 52 is then driven by the capstan 63 along the guide rods 55 and 56 at the tangential velocity of the capstan.

Figure 2:
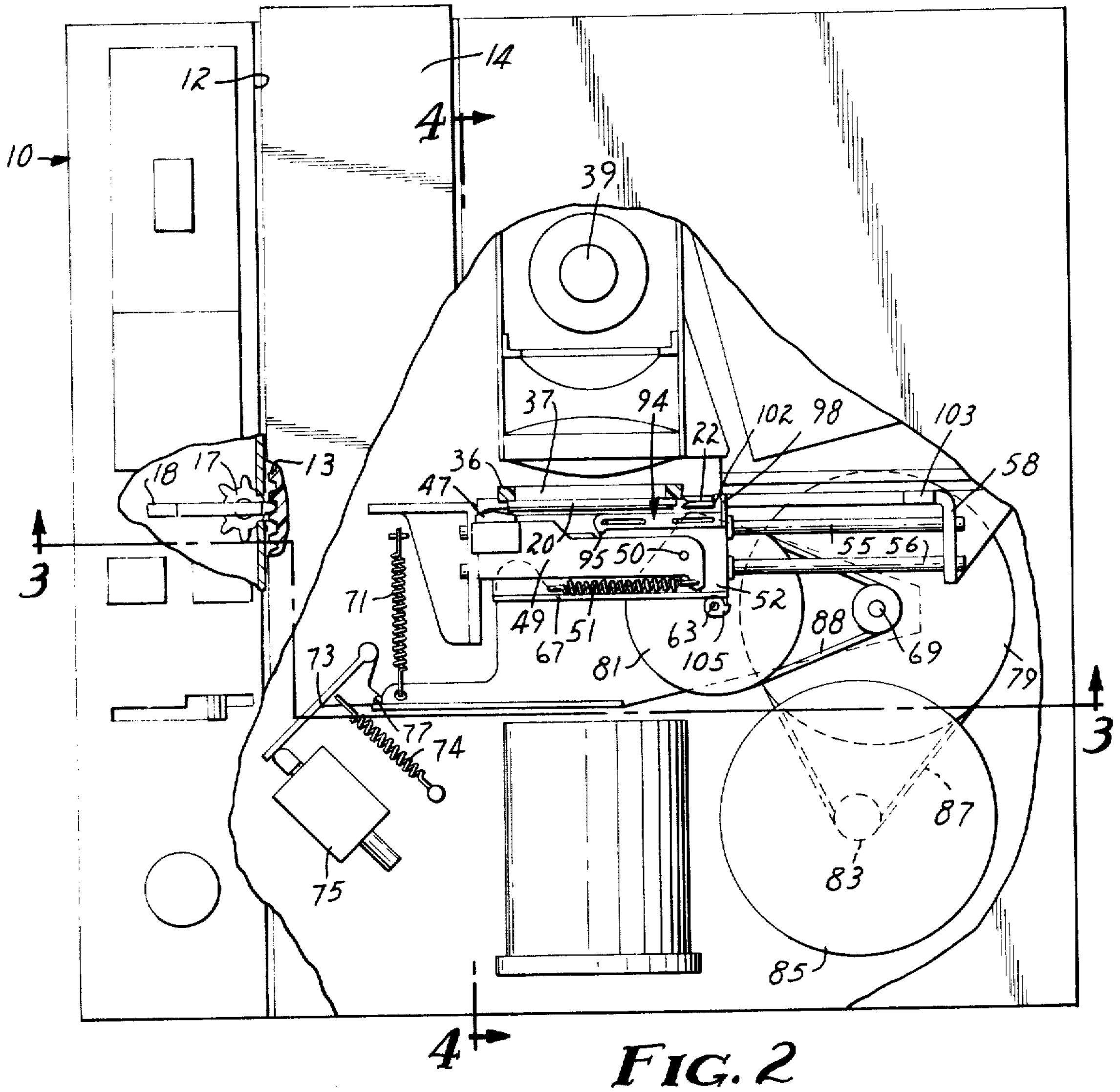
FIG. 2 is a top view partially in section of the machine of FIG. 1.
Figure 3:
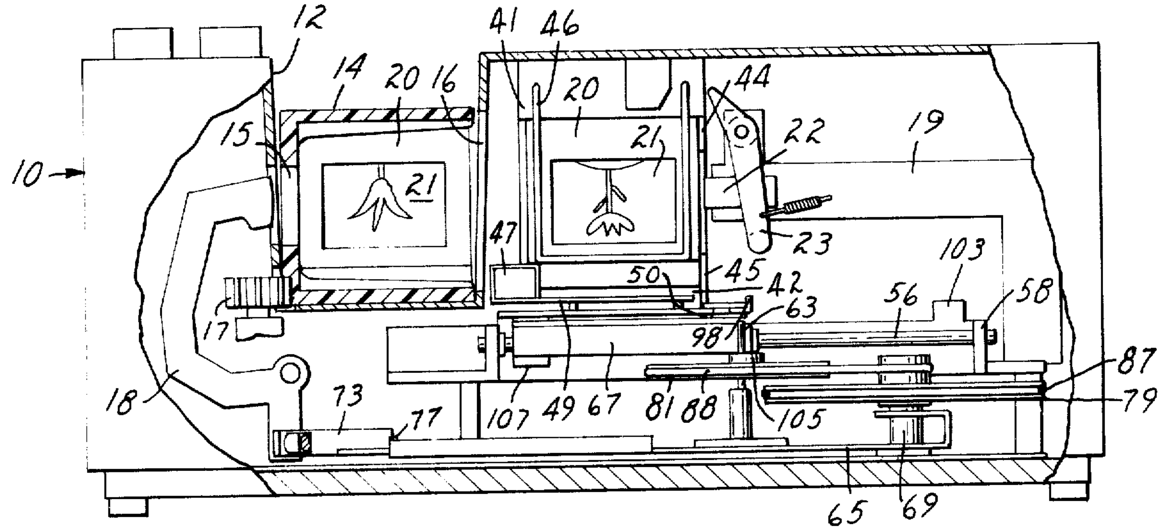
FIG. 3 is a cross-sectional view taken generally along line 3—3 of FIG. 2.

As the carriage 52 begins to move to the right in FIGS. 2, 5, and 6 the ear 90 projecting from the transducer support arm 49 rides down the camming surface 92 thereby permitting the transducer 47 under the bias of spring 51 to engage the magnetic tape 32 on the projection positioned slide frame 20. The carriage is driven and draws the magnetic transducer 47 along the entire length of the magnetic tape 32 in a straight line from one end thereof to the other. Recording or reproduction through appropriate electrical circuitry (not shown) is accomplished as the transducer 47 is moved along the magnetic tape 32 on the projection positioned slide frame 20.

After the transducer 47 has traversed the entire length of the tape 32 the carriage 52 reaches the position whereat the arm 98 of the transducer camming link 94 engages the end stop 103. Continued movement of the carriage causes the camming step 100 on the transducer support arm 49 to engage the nose 95 of the camming link 94 thereby camming the magnetic transducer away from the slide projection position. Nearly simultaneously, the camming wing 105 on the capstan shaft 63 engages the tab 107 projecting from the carriage 52 to cam the capstan 63 away from the resilient material 67 on the carriage 52. Camming of the capstan 63 pivots its support link 65 with the free end thereof passing the vertical locking pin 77 on the solenoid link 73. The solenoid 75 by this time has been deactivated and the pin 77 engages and restrains the end of the capstan support link 65, preventing the capstan 63 from engaging the resilient material 67 on the carriage 52.

The carriage 52 after being disengaged from its drive is rapidly returned to its home position by the carriage return spring 89. As the carriage 52 approaches its home position the arm 98 of the transducer camming link 94 engages the stop 102 and is held while the carriage continues to its home position thereby disengaging the nose 95 of the camming link from the camming step 100 on the transducer support link 49. At nearly the same time the ear 90 projecting from the transducer support arm 49 engages the camming surface 92 to retain the transducer 47 spaced from the slide projection position to permit removal of the slide frame 20.

The solenoid 75 may be activated as many times as desired to record the desired identifying message on the tape 32 on the projection positioned slide frame 20 or to reproduce a message recorded thereon. When desired, the slide return mechanism is actuated causing the slide return arm 19 to move against the projection positioned slide frame 20 to push it out of the slide receiving slot 16. A kicker arm 23 pivoted on the slide return arm 19 is then pivoted to impel the slide out of the slide return arm jaws 22 and into its receptacle in the slide tray 14. The slide tray 14 is then advanced one step by the gear 17 to ready the machine for handling of the slide in the next receptacle in the slide tray 14.

In one specific example of the present invention a magnetic transducer 47 having a radius of curvature of 0.4 inch and a gap width of 30 microinches was utilized and the magnetic tape 32 was Type 277 Magnetic Cassette Tape from the 3M Company with offices at St. Paul, Minn., which tape is capable of resolving a 120 microinch signal. The transducer was resiliently urged against the tape 32 on the projection positioned slide by its biasing spring 51 with a force of 100 grams force to compress the tape-resilient material composite approximately 0.003 inch.

The motor 85 had a rotational velocity of 1700 revolutions per minute, the motor pulley 83 had an effective diameter of 0.505 inch, the reduction pulley 79 had effective diameters of 0.580 inch and 3.312 inches, the capstan pulley 81 had an effective diameter of 2.125 inches and the capstan 63 had an effective diameter of 0.097 inch. The capstan 63 was steel and the resilient material 67 on the carriage 52 was a strip of neoprene with a 60 durometer-Shore A hardness. The resulting tangential velocity at the effective diameter of the capstan 63, and, therefore, the velocity of the magnetic transducer 47 along the tape 32 was 0.36 inch per second.

The belt 87 linking the motor pulley 83 to the speed reduction pulley 79 was formed of an ethylenepropylene copolymer with a 70 durometer-Shore A hardness and the belt 88 linking the speed reduction pulley 79 to the capstan pulley 81 was formed of nitrile rubber with a 90 durometer-Shore A hardness. With this arrangement it has been found that the elastic belt 87 between the motor pulley 83 and the speed reduction pulley 79 absorbs variations in the motor speed and assures uniformity of movement of the magnetic transducer 47 along the tape 32. The quality of the recording is thereby significantly increased. The belt 88 linking the speed reduction pulley 79 to the capstan pulley 81 is not required to be as elastic and could in fact be replaced by an idler roller.

With the above specific embodiment, the 0.36 inch per second recording speed permits 5 seconds of recording time on a 2 inch slide identification clip attached to a 35mm slide frame 20. Examples of messages that can be recorded in this time period at a normal speaking rate are:

1. "This picture was taken from the south rim of the Grand Canyon at sunrise on June Eighteenth."

2. "This is a picture of Aunt Hilda, Uncle Jim, their seven children, their cat and their dog."

3. "In 5 seconds I can identify a single slide or provide one part of a continuing story."

When recording and reproducing with a single machine it has been found that a band width of ± 3 decibels can be obtained with a range of 400 cycles per second to 2500 cycles per second with usable signal at 3000 cycles per second. This range not only permits understandable audio reproduction, it also permits voice identification of most people. Furthermore, interchangability between machines can be obtained with a band width of ± 3 decibels at 1500 cycles per second.

The excellent recording and reproducing properties obtained are due to the excellent reference between the magnetic transducer 47 and the magnetic tape 32 on the slide identification clip 24. The hard bottom of the slide identification clip provides a reference surface for tracks recorded on the tape 32. When the slide frame 20 is moved into projection position with the bottom of the slide clip 24 resting on the horizontal ledge 42 of the projection position, the tape is referenced through the bottom edge of the slide identification clip and the horizontal ledge 42 to the magnetic transducer 47 to provide a precise reference as is needed to provide high quality recording and reproduction. The straight line movement of the transducer 47 also assures high quality recording by traveling a constant path each pass it makes across the slide projection position. The combination assures that the azimuth and elevation relationships between the magnetic transducer 47 and the magnetic tape 32 will be repeatable whenever the slide is removed from and replaced in position for projection and recording or reproduction.

We claim:

1. Apparatus for audio identification of a photographic transparency mounted in a slide frame, comprising:

a composite identification strip comprising a strip of a magnetic tape capable of resolving a 600 microinch signal secured to and backed by a strip of a resilient material, said composite having a smooth, uniform, magnetizable surface, being compressible between 0.001 inch and 0.010 inch by a 0.4 inch radius cylinder extending across a 0.15 inch width of said composite and forced against said magnetizable surface with 250 grams force, said composite identification strip being mounted on one face of a said slide frame with said magnetizable surface exposed, a slide projector including means for positioning a said slide frame for projection of images on the transparency, a magnetic transducer having a cylindrical face with an effective radius of 0.04 inch to 1.0 inch and a gap width less than 200 microinches, means supporting said transducer for movement along the magnetizable surface of said composite identification strip mounted on a projection positioned slide frame from one end thereof to the other, means for biasing said transducer against the magnetizable surface of the composite identification strip with sufficient force to compress said composite at least 0.001 inch and not more than 0.007 inch, and means for moving said transducer from one end of the composite identification strip on a projection positioned slide frame to the other end thereof at a uniform velocity less than 0.75 inch per second to record or reproduce a transparency identifying message on the magnetic tape in a single pass.

2. The apparatus of claim 1 wherein said means supporting said transducer includes a transducer carriage supported for movement parallel to said direction of movement of said transducer and having a strip of a resilient material attached thereto parallel to its direction of movement and wherein said means for moving said transducer comprises a rigid cylindrical capstan engageable with said strip of resilient material on said carriage to move said carriage and said transducer.

3. The apparatus of claim 2 wherein said means supporting said transducer includes a transducer support arm mounted on said transducer carriage for pivotal movement about an axis perpendicular to the direction of movement of said carriage and parallel to the face of the projection positioned slide frame and resiliently biased to bias said transducer against said composite identification strip on a projection positioned slide frame.

4. The apparatus of claim 2 wherein said means for moving said transducer includes a capstan flywheel coaxial with said capstan, a high speed drive motor having a drive shaft, a reduction wheel having a large and a small diameter drive surface which are coaxial, a first elastic belt linking said motor shaft to said large diameter drive surface of said reduction wheel, and means linking said small diameter drive surface of said reduction wheel to said capstan flywheel.

5. The apparatus of claim 1 including means for camming said magnetic transducer away from a said strip of magnetic material on a said projection positioned slide frame upon movement of said carriage a predetermined distance corresponding to movement of said transducer from one end of the strip of magnetic tape to the other end thereof.

* * * * *